Sept. 8, 1953   G. J. SHARPS   2,651,133
FISH LURE
Filed June 11, 1952

INVENTOR:
GEORGE J. SHARPS
BY
ATT'YS

Patented Sept. 8, 1953

2,651,133

UNITED STATES PATENT OFFICE 2,651,133

FISH LURE

George J. Sharps, Momence, Ill., assignor to P & K Incorporated, Momence, Ill., a corporation of Illinois Application June 11, 1952, Serial No. 292,907

4 Claims. (Cl. 43—42.37)

1

The main objects of the present invention are to provide an improved construction for fish lures with bodies simulating bugs, and other forms of bait; to provide an improved construction for fish lures that is simple to manufacture, that is capable of being made in a great variety of sizes without change other than the proportion of parts; to provide an improved construction of this kind that is capable of using very light materials for the lure body and still will have great resistance to abuses such as are inflicted on such devices by the struggles of the fish and by the strains of releasing the hook from the fish's mouth; and to provide an exceedingly simple form for the hook member of such a structure.

A specific embodiment of this invention is illustrated in the accompanying drawings, in which.

Figure 1:
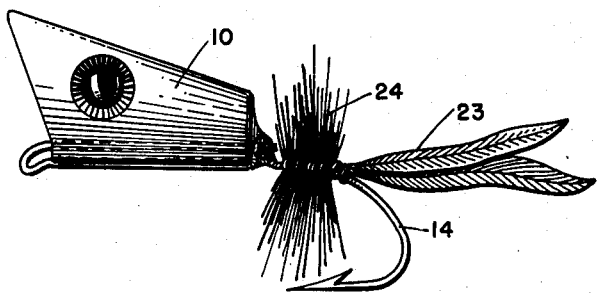
Figure 1 is a side view of a preferred form of a complete fish lure.

In the form shown in the drawings, the body 10 is made of cork or other suitable light material and is of frusto-conical form with an inclined concave base 11 at the line end of the body.

The body has a groove 12 running from end to end along one side and a bore 13 spaced radially inward from and parallel with the groove 12. The hook member 14 is of wire of substantially uniform diameter except for the barb 15 and the shank of the hook is bent back upon itself to form a U-shaped portion with a main shank arm 16 which is seated in the groove 12 and a latch arm 17 that is inserted through the bore 13.

The bight 18 at the juncture of the arms 16 and 17 is deflected downward so that the eye 19 that is formed thereby will be positioned a slight distance to the hookside of the shank arm 16 in the plane of the arms 16 and 17 and the hook 14. The length of the latch arm 17 is sufficient to extend slightly beyond the end of the body 10 that is adjacent the hook 14.

The shank 16 has a keeper formation 20 in the form of a spirally twisted bight offset to a position for engaging the free end of the latch arm

2

Figure 2:
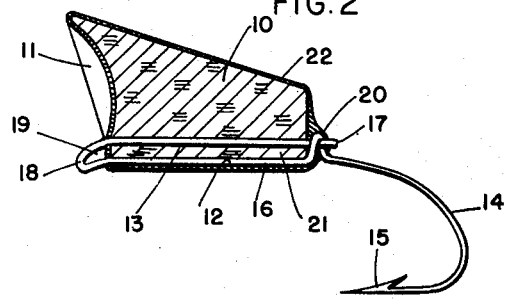
Fig. 2 is a section taken in the plane of the hook member illustrating the manner in which the body of the lure is attached to the hook.

17 when the shank arms of the hook member are in the position in which they are shown in Figs. 1 and 2. In the form shown this bight is in the form of a single spiral whorl and the hook is substantially in the same plane with the shank arms.

After the latch arm has been inserted through the bore 13, the keeper bight 20 can be readily brought into hooked engagement with the end of the latch arm 17, due to the resiliency of the wall 21 of the body 10 that separates the groove 12 and bore 13.

Finally, a coating of enamel 22 is applied to the surface of the body 10 and the latch structure is completely embedded therein. The groove 12 is also filled with enamel which, when hardened, prevents any possibility of disengagement of the latched parts of the shank.

The tufts of feathers 23 and hair or other fibres 24 that are usually applied to fish lures to simulate live bait are attached to the part of the hook 14 that extends beyond the body 10.

Figure 3:
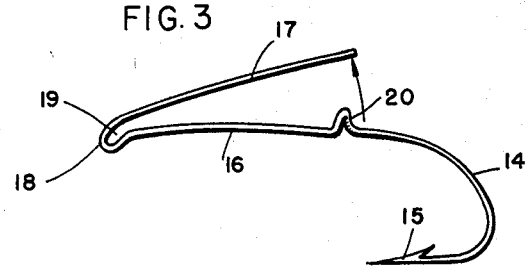
Fig. 3 is a detail showing the structure and shape of the hook member before it is applied to the lure body.
Figure 4:
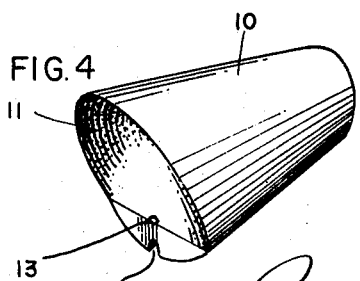
Fig. 4 is a perspective view of the lure body showing the relation of the bore and exterior groove which are occupied by parts of the hook shank in the finished lure.

In order that the shank arm 16 will lie snugly against the bottom of the groove 12, this part of the shank in its initial form is slightly bowed convexly toward the shank arm 17 as shown in Fig. 3, and straightens out in the finished structure.

The parts of the shank 16 immediately in front of and behind the spiral bight 20 are spaced apart laterally of the plane of Fig. 2 to permit the end of arm 17 to enter the keeper but the barbed end and body part of the hook member 14 lie mainly in the plane of the shank arms so that its weight causes the hook to hang downward so that the device normally assumes the position in which it is illustrated in Figure 1, when it reaches the surface of the water in casting.

It will be seen that the identical structure is adaptable to all sizes of fishhook construction and is readily formed out of spring steel wire of any diameter suitable for fishhooks for various purposes.

Although but one specific embodiment of this invention is herein shown and described, it will be understood that details of the construction shown may be altered or omitted without departing from the spirit of this invention as defined by the following claims.

I claim:

1. A fish hook comprising a single element of wire shaped to have a curved bill terminating in a barb point at one end thereof, said bill having at its other end a shank, said shank having an open loop at the bill end thereof and a second loop at the opposite end thereof, said second loop having a free terminal end adapted to be engaged in the first loop whereby a lure body may be rigidly held between the intermediate portion of the shank and the free terminal end.

2. A fish hook comprising a single element of wire shaped to have a curved bill terminating in a barb point at one end thereof, said bill having at its other end a shank including a straight portion, said shank having an open loop at the bill end thereof and a second loop at the opposite end thereof, said second loop having a free terminal end adapted to be engaged in the first loop whereby a lure body may be rigidly held between the intermediate portion of the shank and the free terminal end, said second loop having side portions inclined downwardly with respect to the straight portion of said shank whereby the first and second loops constitute stops adapted to restrain a lure body from longitudinal movement relatively to the hook.

3. The combination with a fish hook comprising a single element of wire shaped to have a curved bill terminating in a barb point at one end thereof, said bill having at its other end a shank, said shank having an open loop at the bill end thereof and a second loop at the opposite end thereof, said second loop having a free terminal end adapted to be engaged in the first loop whereby a lure body may be rigidly held between the intermediate portion of the shank and the free terminal end, of a lure body, said lure body having a groove in the body thereof to receive a portion of the shank of the hook between both loops.

4. The combination with a fish hook comprising a single element of wire shaped to have a curved bill terminating in a barb point at one end thereof, said bill having at its other end a shank including a straight portion, said shank having an open loop at the bill end thereof and a second loop at the opposite end thereof, said second loop having a free terminal end adapted to be engaged in the first loop whereby a lure body may be rigidly held between the intermediate portion of the shank and the free terminal end, of a lure body, said lure body having a groove in the body thereof to receive a portion of the shank of the hook between both loops, said second loop having side portions inclined downwardly with respect to the straight portion of said shank whereby the first and second loops constitute stops adapted to restrain a lure body from longitudinal movement relatively to the hook.

GEORGE J. SHARPS.

References Cited in the file of this patent

UNITED STATES PATENTS

| Number | Name | Date |
| --- | --- | --- |
| D. 33,775 | Bower | Dec. 25, 1900 |
| 254,313 | Hemming | Feb. 28, 1882 |
| 1,461,617 | Hill | July 10, 1923 |
| 1,548,662 | Crawford | Aug. 4, 1925 |
| 2,228,591 | Brown | Jan. 14, 1941 |
| 2,570,468 | Matthes | Oct. 9, 1951 |